March 25, 1958  T. C. MASCARO  2,827,751
GRASS CUTTING AND TURF RENOVATING MACHINE
Filed Dec. 11, 1953  5 Sheets-Sheet 1
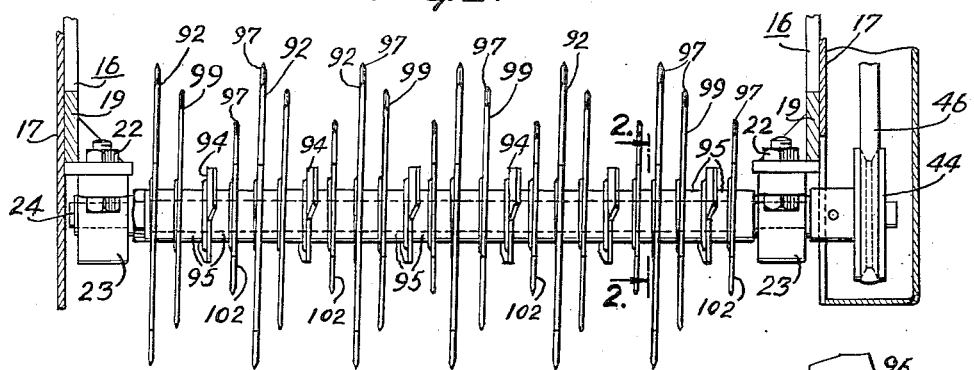
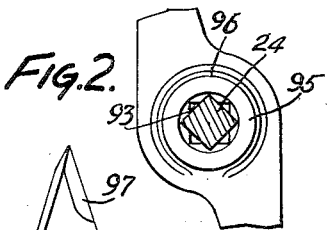
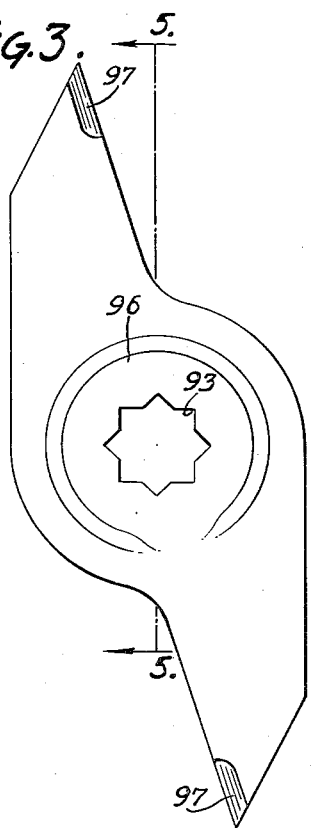
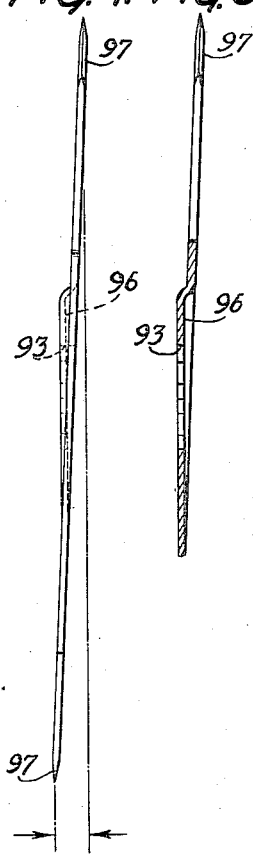
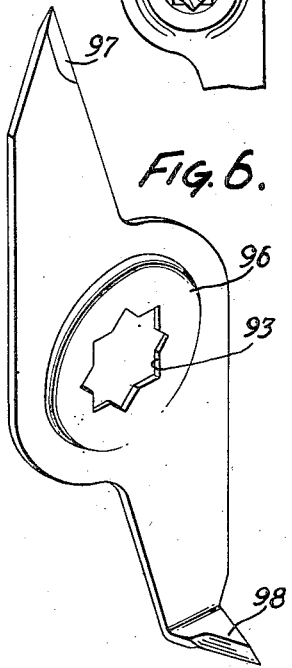
Inventor:
Thomas C. Mascaro
by his Attorneys
Howson & Howson March 25, 1958 — T. C. MASCARO — 2,827,751
GRASS CUTTING AND TURF RENOVATING MACHINE
Filed Dec. 11, 1953 — 5 Sheets-Sheet 2
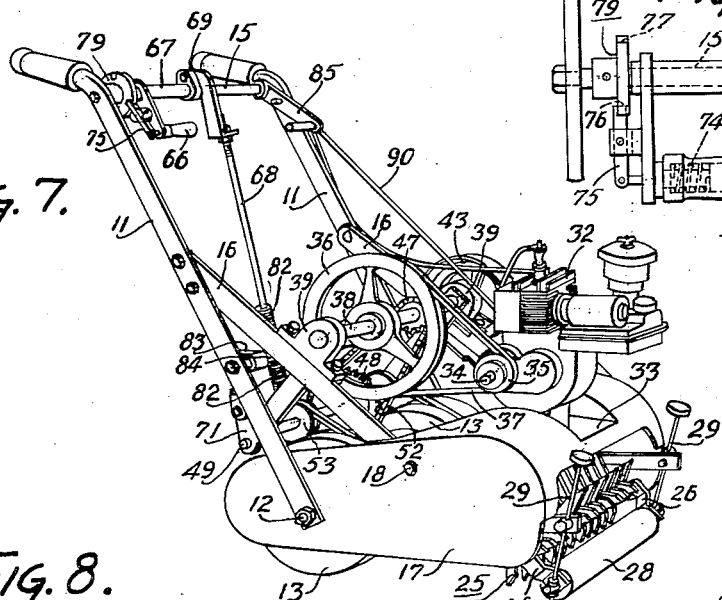
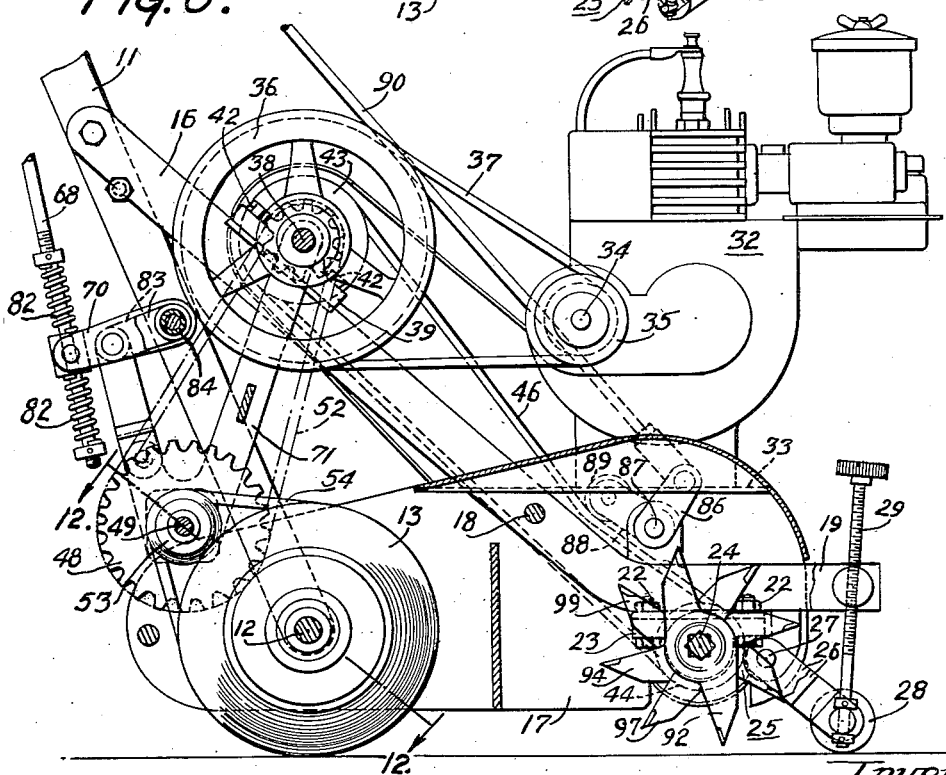
Inventor:
Thomas C. Mascaro
by his Attorneys
Howson & Howson March 25, 1958
T. C. MASCARO
2,827,751
GRASS CUTTING AND TURF RENOVATING MACHINE
Filed Dec. 11, 1953
5 Sheets-Sheet 3
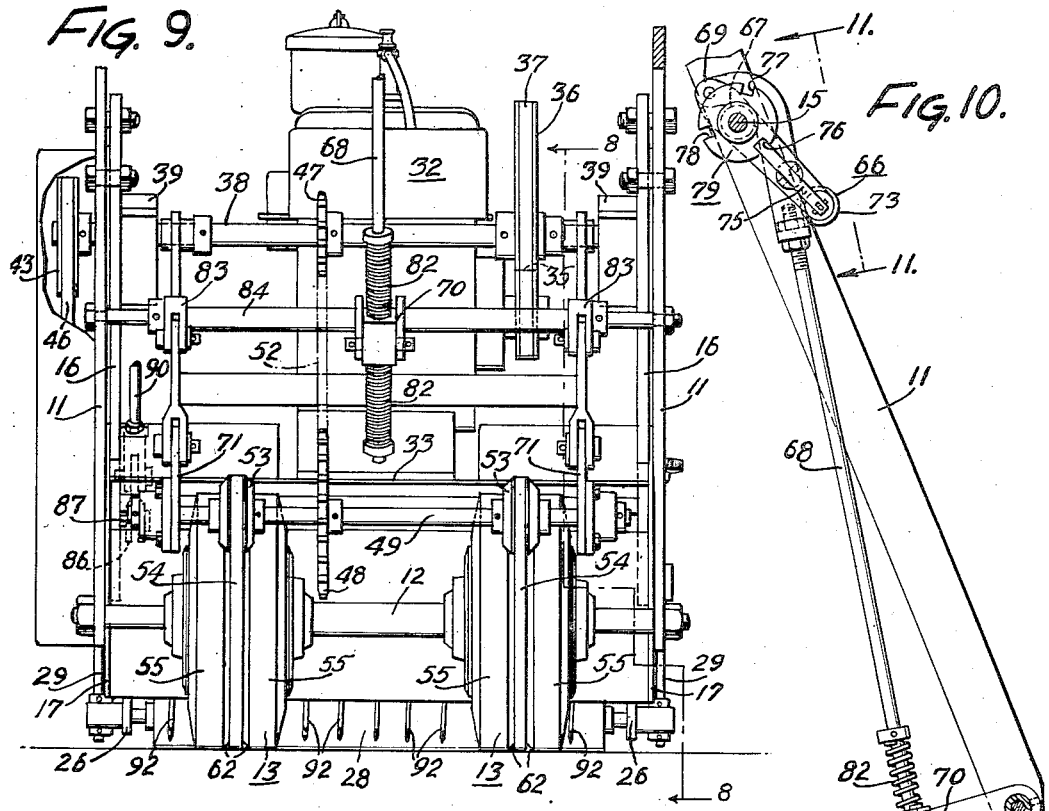
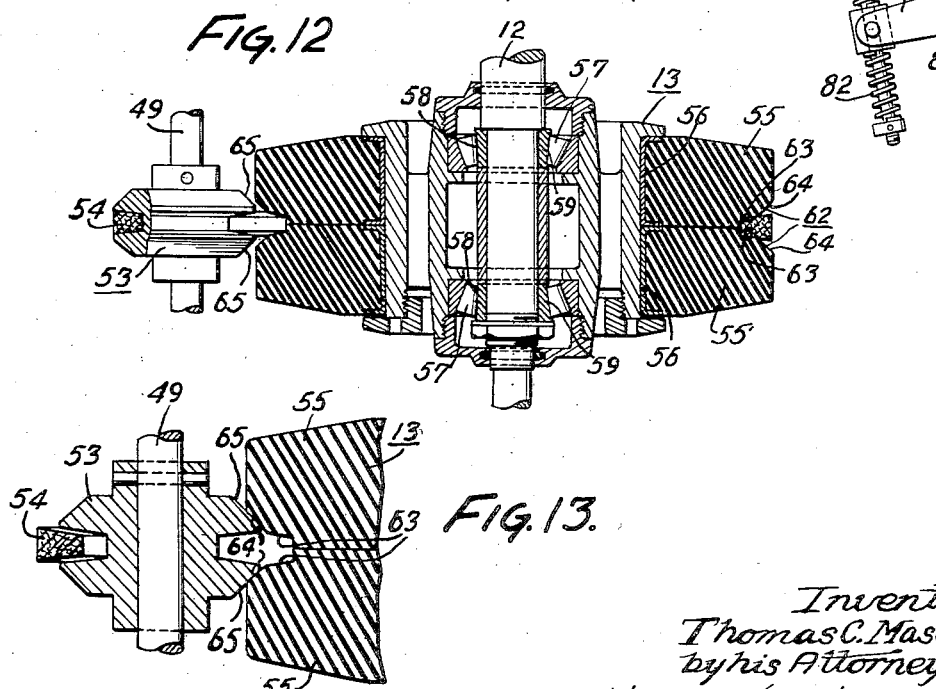
Inventor:
Thomas C. Mascaro
by his Attorneys
Howson & Howson March 25, 1958 T. C. MASCARO 2,827,751
GRASS CUTTING AND TURF RENOVATING MACHINE
Filed Dec. 11, 1953 5 Sheets-Sheet 4
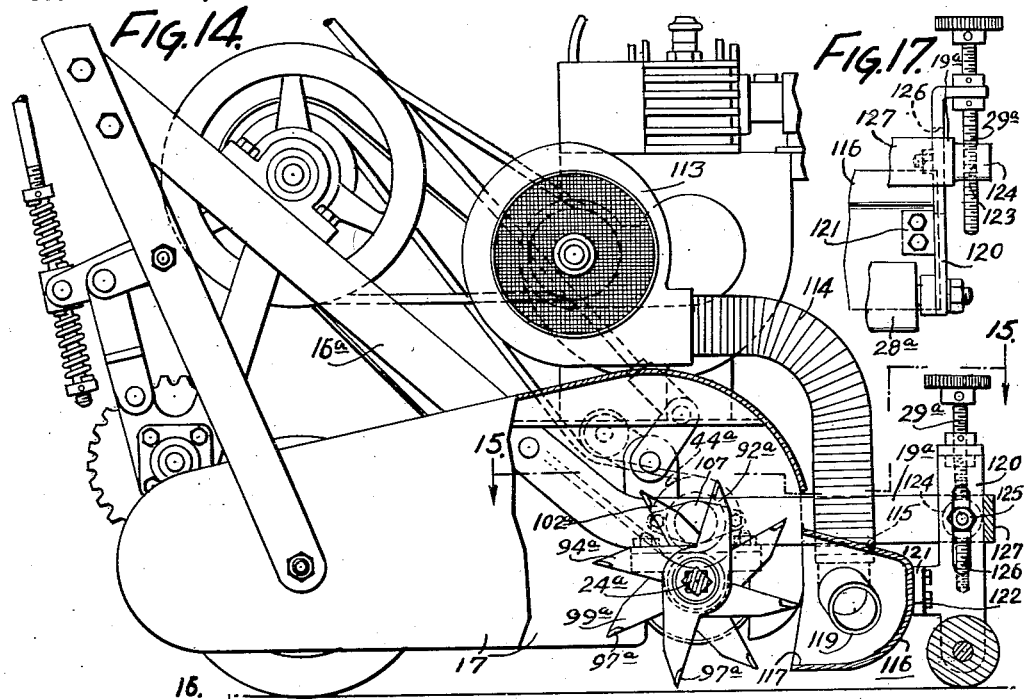
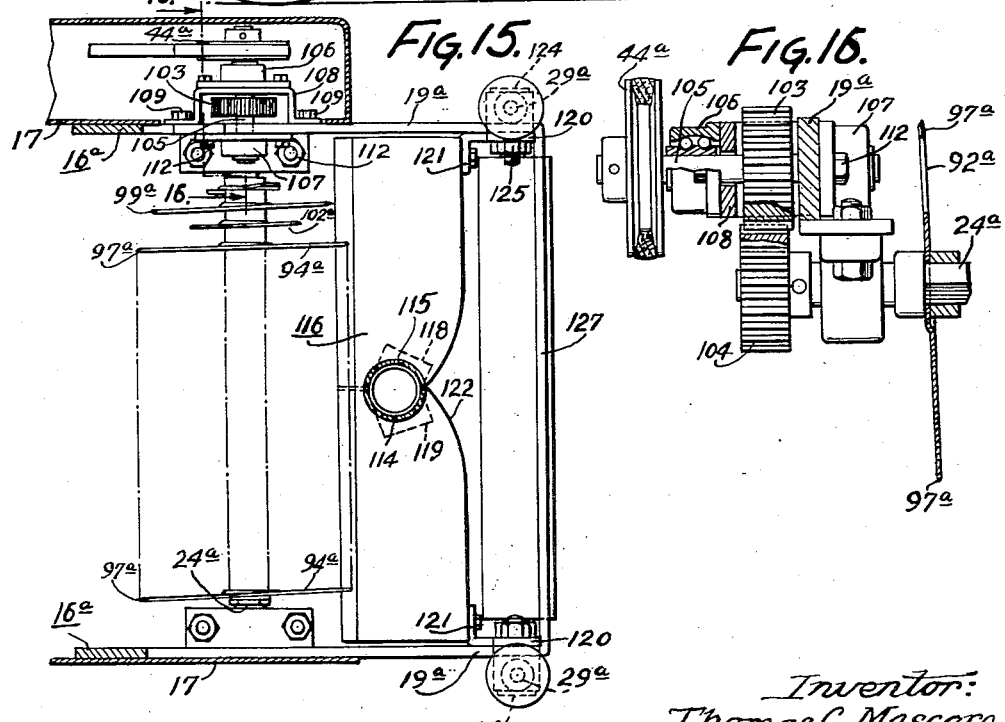
Inventor:
Thomas C. Mascaro
by his Attorneys
Howson & Howson

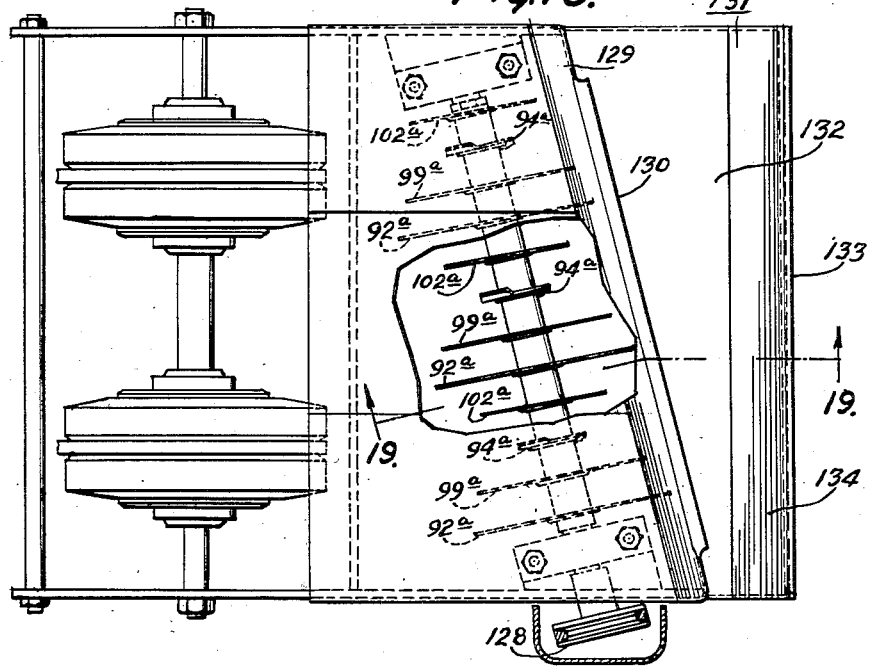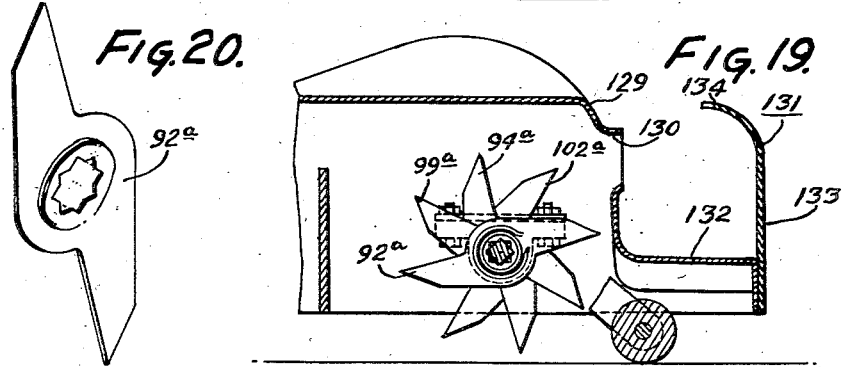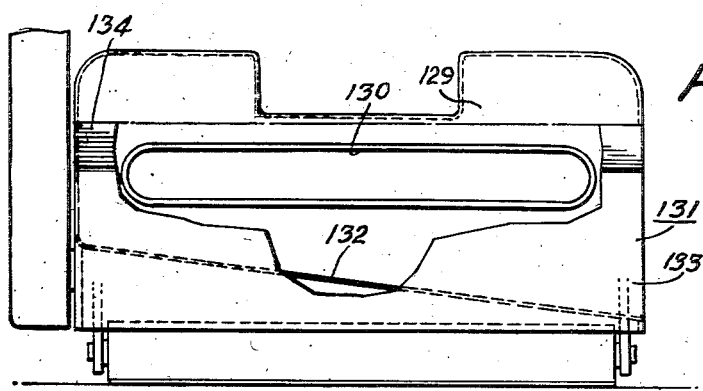

United States Patent Office 2,827,751
Patented Mar. 25, 1958

2,827,751
GRASS CUTTING AND TURF RENOVATING MACHINE

Thomas C. Mascaro, West Point, Pa.

Application December 11, 1953, Serial No. 397,552

4 Claims. (Cl. 56—249)

This invention relates to a novel grass cutting machine embodying novel means operable to renovate the lawn or turf as the machine cuts the grass.

One of the principal problems in turf maintenance is the control of accumulated thatch, crab grass, chick weed, etc. Small quantities of stems, roots, and clippings readily decay and provide compost which is beneficial to the soil. However, where a turf is maintained continuously, there is a tendency for plant residue to accumulate so that organisms harmful to grass plants are propagated, free passage of water and fertilizer to the soil is prevented, and poor aeration of the soil results. In the past, thatch removal has been effected through the medium of hand tools. This method has proved time consuming and expensive and often results in damage to root systems. The effective control of crab grass, chick weed, etc. has been sought after for many years but never attained.

With the foregoing in mind, a primary object of the invention is to provide a novel grass cutting machine which is constructed and arranged simultaneously to cut the grass and renovate the turf by dislodging and comminuting excess thatch.

A further object of the invention is to provide a machine of the stated type by means of which runners and leafy plants may be destroyed.

A still further object of the invention is to provide a grass cutting and turf renovating machine of the aforementioned type which is self-propelled and wherein the cutting blades rotate oppositely to the direction of travel of the machine.

Another object of the invention is to provide a grass cutting and turf renovating machine of the stated type wherein the cutting blades can be utilized to aerate the soil, if desired.

These and other objects of the invention and the various features and details of the construction and operation thereof are more fully set forth hereinafter with reference to the accompanying drawings in which:

Fig. 1 is an enlarged elevational view, partly in section, showing the cutter blade assembly;

Fig. 2 is a view taken substantially on line 2—2 of Fig. 1;

Fig. 3 is a greatly enlarged elevational view of one of the blades of the blade assembly of Fig. 1;

Fig. 4 is an end elevational view of the blade shown in Fig. 3;

Fig. 5 is a sectional view taken substantially on line 5—5 of Fig. 3;

Fig. 6 is a view in perspective of a modified form of blade;

Fig. 7 is a view in perspective of the turf renovating machine of the present invention;

Fig. 8 is a sectional view of the device taken along line 8—8 of Fig. 9;

Fig. 9 is a rear elevational view of the turf renovating machine of Fig. 7;

Fig. 10 is an enlarged fragmentary elevational view showing the details with parts broken away and shown in section of the reversing means;

Fig. 11 is a view taken substantially on line 11—11 of Fig. 10;

Fig. 12 is an enlarged plan view, partly in section, of one of the traction wheels employed in the turf renovating machine of the present invention showing the relation of the reversing sheave to the traction wheel when the device is arranged to travel in a forward direction;

Fig. 13 is an enlarged fragmentary sectional plan view of a portion of the drive mechanism of Fig. 12 showing the reversing sheave in the position it assumes when the device is arranged for reverse operation;

Fig. 14 is a side elevational view, partly broken away, of a modified form of turf renovating machine;

Fig. 15 is a view taken substantially on line 15—15 of Fig. 14;

Fig. 16 is an enlarged sectional view taken substantially on line 16—16 of Fig. 15;

Fig. 17 is a fragmentary elevational view showing the details of the height adjusting assembly;

Fig. 18 is a plan view of another modified form of the invention in which the shaft of the cutter assembly is canted, certain elements being removed for the sake of clarity;

Fig. 19 is a view taken substantially on line 19—19 of Fig. 18;

Fig. 20 is a view in perspective of still another form of the cutter blade; and, Fig. 21 is a front elevational view of the disclosure of Fig. 18.

With reference to the drawings and more particularly to Fig. 1, the blade assembly therein illustrated comprises a plurality of thin metal blades vertically mounted in spaced relation on a normally horizontal rotatable shaft. The blades as shown in Figs. 3 through 5 are angularly disposed with respect to the shaft and are phased radially as to afford a continuous turf treatment. This vertical blade arrangement exhibits considerable improvement in efficiency over either the reel type or the so-called rotary mower.

The details of the cutter assembly will now be more fully described with reference to the particular blade arrangement shown in Fig. 1, it being understood that other blade phase arrangements may be employed without departing from the spirit of the invention. The series of blades 92 is axially disposed on the shaft 24, which necessarily is other than circular cross-section and in this instance takes the form of a square. The series of blades 94 is disposed on the shaft perpendicular to the blades 92 and, in addition, a series of blades 99 and a series of blades 102 are disposed alternately with respect to the series of blades 92 and the series of blades 94 so that each successive blade is displaced 45° from the preceding blade using the axis of the shaft 24 as the rotation reference. These blades, as clearly shown in Fig. 10, are provided with an aperture 93, the edges of which extended would form a double square. This particular shape affords the degree of selectivity to relative position of the blades with respect to the shaft. It will be understood that this aperture may assume the conformation of any polygon so that any desired phasing may be attained. The angular relation of these blades to the shaft is brought about by stamping the center portion 96 of the blades so that this center portion is angularly disposed with respect to the blade tips. When the blades are assembled in operative relation, the respective center portions are perpendicular to the axis of the shaft 24 and the blade tips assume an angular relation with respect to this axis. This arrangement permits a particularly effective cooperation between one series of blades and the other series of blades effectively to cut a relatively wide swath of thatch laden turf. As the blade tips rotate, the edge portions 97 alternately strike the turf and cut the grass blades and accumulated thatch at the same time. It will be understood that the angles formed by the blade tips may be of any desired degree according to turf conditions and that the spacers 95, which are permitted freely to rotate about the shaft, may be of any desired width so long as the blades do not clash in operation.

Fig. 1, for example, shows a blade arrangement particularly suitable for thatch removal in which the spacers are 5/8 inch in width while the tips of adjacent blades are 5/16 inch apart at their points of greatest proximity. When turf conditions indicate that greater spacing is needed, the blade assembly may be dismantled and a plurality of spacers such as spacers 95 may be inserted between adjacent blades as required.

In the modified form of the invention shown in Fig. 6, the extremity 98 of one tip of each blade is bent at right angles to the plane of the blades so that this tip may sever upstanding grass blades while the oppositely disposed blade tip severs bent grass and thatch, as will be understood. This particular arrangement has proved very effective in controlling runners and leafy plants and cutting upstanding grass blades in one single operation.

In Fig. 7, of the drawings, there is illustrated a form of grass cutting and turf renovating machine made in accordance with the present invention and embodying the cutter assembly of Fig. 1. This machine comprises two oppositely disposed frame members 11 each having an aperture at the lower end thereof for the reception of axle 12 of driving wheels 13. The upper ends of these frame members have any type of conventional handle portions integral therewith, for example, as illustrated in Fig. 7 and are held in spaced relation by bar 15. Struts 16 are fixedly secured at one end to the frame members intermediate the ends of the latter and at the other end to the shell 17 by means of fastening member 18. These struts are provided at the lower end thereof with longitudinal extensions 19, extending parallel to the ground, to which are secured, by fastening elements 22, bearing blocks 23 for the shaft 24 of the cutter assembly 25. Auxiliary legs 26 are pivoted on pins 27 of the side walls of the shell 17. The other ends of the legs 26 are apertured for the reception of the shaft of the roller 28. Threaded adjusting rods 29 are provided to vary the distance between the extensions 19 and the axis of the shaft of the roller 28 as desired, thus adjusting the position of the cutter assembly with respect to the turf.

A suitable power means 32, which in this instance takes the form of an internal combustion engine, is readily secured to a horizontal shelf 33 formed integrally with the shell 17. This engine is provided with a driveshaft 34 on which is mounted a pulley 35 which rotates sheave 36 by means of belt 37. This sheave 36 is mounted for rotation on jackshaft 38 journaled in bearing blocks 39 which are secured to the strut 16 by means of fastening elements 42. Transmission of power to the cutter assembly 25 is afforded by a sheave 43 fixedly secured to the shaft 38 to rotate therewith. This sheave 43 is operably connected to the sheave 44 mounted on the shaft 24 of the cutter assembly, by means of the belt 46.

Motor power for the driving wheels 13, in this instance, is effected through the medium of a sprocket 47 rotatively mounted on the jackshaft 38 and drivingly connected to the sprocket 48 on the auxiliary shaft 49 by means of endless chain 52. Sheaves 53, rotatively mounted on the shaft 49, are connected by belts 54 directly to the wheels 13.

An important feature of this invention is the character of these traction wheels 13 which are designed to prevent injury to the turf by distributing the weight of the machine over a large area. This result can be accomplished by utilizing a plurality of separate wheels, or, as in the present instance, by using a limited number of wide wheels, each of which has a pair of tires. As shown in Fig. 12, the tires 55 are mounted on circular channel members 56 secured to the rim of the wheel. Friction losses are reduced by means of conventional tapered roller bearings 57 which engage corresponding surfaces 58 on the bushing 59. Each tire of a pair is provided with a circumferentially extending offset portion 62 which comprises separate faces 63 and 64 opposed to corresponding faces on the other tire so as to form a groove. The sides of the belts 54 engage the faces 63 when the device is arranged for forward operation, and the faces 64 are engaged by the faces 65 of the sheave 53 when the machine is arranged for reverse operation as will be more fully hereinafter described. When the belt 54 engages the wheel 13, the periphery of the belt coincides with the periphery of the wheel so that a continuous surface is presented to the turf and damage thereto is thereby minimized.

The power connection to the wheels 13 is disengaged by rotating lever 66 clockwise as seen in Fig. 7, thus rotating the torque tube 67, concentrically mounted on the bar 15. As the torque tube rotates, the control rod 68 which is operably connected to the eccentric 69 moves downwardly, thus causing the yoke 70 to pivot the links 71 about the jackshaft so that the sheaves 53 move out of engagement with the belt 54. It will be noted by reference to Fig. 11 that the lever 66 is provided with a handle 73 having a spring 74 in a cylindrical cavity therein. The spring normally urges the handle against one side of the lever and rotates the key 75 to the position shown in Fig. 11. In this position the free end of the key 75 is retained in one of three circumferentially spaced radially extending kerfs 76, 77 and 78 formed in the lock member 79, which is rigidly secured to the bar 15. These kerfs represent the three desired positions of the auxiliary shaft 49 i. e. the engaged position, the neutral position, and the disengaged position, respectively. The control rod 68 is normally urged into neutral position by a pair of oppositely arranged springs 82. Relative movement of the auxiliary shaft 49 with respect to the elements 11 is limited by the links 83 which are held in spaced relation by the bar 84 upon which the control rod 68 acts to engage or disengage the sheave 53 as desired.

The engagement of the cutter assembly is controlled by the lever 85 mounted for rotation about the bar 15 in spaced relation to the free end of the torque tube 67. For example, to disengage the cutter assembly, the lever 85 is pivoted downwardly about the bar 15 so that the control rod 90 causes the link 86 to rotate clockwise, as seen in Fig. 8, about the pin 87 secured in the adjacent side wall 17. Link 88, to which roller 89 is rotatively secured, is fixedly secured to the pin 87 as to rotate therewith. As the link 88 moves in a clockwise direction as seen in Fig. 8, the roller 89 is disengaged from the belt 46 and operative engagement of the belt with the sheave 44 is terminated. Merely reversing this procedure will afford reengagement of the belt with the sheave 44.

In Figs. 14 through 16 is disclosed a modified form of turf renovating machine which differs from the machine previously described in that the cutter assembly shaft 24a rotates oppositely from the shaft of the device shown in Fig. 1. This arrangement has proved to be particularly effective in renovating the surface of golf course greens. It will be noted that each blade is arranged so that the sharpened edges 97a will cut in the opposite direction of that disclosed in the principal form of the invention.

Reversal of direction of the shaft 24a is afforded by gears 103 and 104. As the sheave 44a rotates in a clockwise direction as seen in Fig 14, the gear 103 also rotates in a clockwise direction but the engagement of the gear 103 with the gear 104 causes the latter and consequently the shaft 24a to rotate oppositely. The sheave 44a and the gear 103 are mounted on a stub shaft 105 suitably journaled in bearings 106 and 107, the former being mounted on the gear housing 108 which is secured by fastening means 109 to the exterior surface of the extension 19a, and the latter being secured to the inside surface of the extension 19a by means of fastening elements 112.

In this modified form of the invention, I have found the need for expelling grass clippings, etc., to be necessary for the reason that accumulations are built up so rapidly that malfunctioning of the machine results. Accordingly, I mount a blower 113 on the top of the shell 17 in operative relation to the engine. This blower is provided with a conduit 114, the opposite end of which is inserted in an aperture 115 in the hood 116. This hood is mounted at each end, by means of brackets 121, to supports 120, which are adjustably secured to the machine through the medium of the rods 29a which are threadably received in apertures 123 in lugs 124, which, in turn, are secured to the extensions 19a by fastening elements 125. These supports 120 are provided with longitudinally extending slots 126 to permit relative motion with respect to the fastening elements 125. In this modified form of the invention the extensions 19a are provided with a joining bar 127 to afford greater rigidity. The adjustability of the height of the front end of the machine varies the effective depth of cut, as will be understood. The scoop portion 117 picks up the grass clippings and they are expelled from each side of the machine through an aperture (not shown) in the side walls of the scoop. The direction of air flow is controlled by the extensions 118 and 119 secured to the free end of the conduit 114 and by the conformation of the front wall 122 of the hood.

It has been observed that a mower of the type disclosed herein operates efficiently when the turf is cut twice with the second cutting being at right angles with the first cutting. With this in mind, I provide a mower as shown in Fig. 18 having its cutter assembly canted at a slight angle with respect to the shaft of the wheels. This arrangement produces substantially the same result as perpendicular mowing in the absence of the necessity for additional traverses. In this modified form of the invention the blades 92a, 94a, 99a, and 102a are arranged the same as in the other form of the invention except that two ⅝" spacers are utilized between each blade and the blades are thin spring steel. This spacing has proved very effective in the control of crab grass, chick weed, and leafy plants. I prefer a spring steel blade in the order of .032" thickness so that the blade will never become duller than its own thickness and no sharpening is required. In this arrangement, the rotation of the cutter assembly is identical to that disclosed in the principal form of the invention. The shaft of this cutter assembly is motivated by a power transmission arrangement similar to that shown in other forms of the invention and has a sheave 128 on the jackshaft mounting the cutting blades which is connected to the drive means to cause rotation of the cutting blades. To eliminate the flow of grass clippings into the path of the mower, a hood 129 is provided having an elongated aperture 130 extending parallel to the shaft of the cutter assembly and through which clippings are cast tangentially from the cutter assembly, and a wedged-shaped trough 131 which receives the clippings and discharges them at the left side of the machine when viewed from the position of the operator. The bottom wall 132 of the trough is inclined from the right side to the left side to facilitate this result. The front wall 133 has a curved portion 134 to prevent the flow of clippings thereover. In this form of the invention a blower of the type shown in Fig. 14 is not required because of the inclination of the cutter assembly shaft and the utilization of the inherent centrifugal force of the cutter blades.

In the forms of the invention disclosed in Figs. 7 and 14 the effective height of the cutter blades may be lowered so that the blades penetrate the turf, thus effecting desirable aeration. When used for this purpose, the blade assemblies are de-energized and the power to the traction wheels is maintained. The forward roller, being adjustable as to height, permits any desirable penetration of the soil.

I claim:

1. The combination with a turf renovating machine having a frame rotatably supported on traction wheels for movement in a selected path and a shaft rotatably carried by the frame extending crosswise of the path of movement of the machine, of a series of unitary cutting members fixedly mounted on the shaft in uniformly spaced relation therealong, each of said cutting members comprising a central hub portion lying in a plane perpendicular to the axis of the shaft, and integral blade portions projecting generally radially in opposite directions outwardly from said central hub portion, said blade portions lying in a common plane angularly disposed with respect to the plane of said central hub portion.

2. A device as claimed in claim 1 wherein the common plane of the projecting blade portions is disposed at a small acute angle with respect to the plane of the central hub portion.

3. For a mobile turf renovating machine having a driven cutter shaft mounted crosswise of the path of movement of the machine, a unitary cutting member of sheet material comprising a flat apertured central hub portion and integral blade portions projecting generally radially in opposite directions outwardly from said central hub portion, said integral blade portions lying in a common plane and the central hub portion lying in a second plane angularly offset from the common plane of said blade portions and adapted to extend perpendicular to the axis of the machine cutter shaft when mounted thereon.

4. A cutting member as claimed in claim 3 wherein the common plane of the projecting blade portions is disposed at a small acute angle with respect to the plane of the central hub portion.

References Cited in the file of this patent

UNITED STATES PATENTS

| | | |
|---|---|---|
| 1,211,566 | Fortney | Jan. 9, 1917 |
| 1,709,791 | Jerram | Apr. 16, 1929 |
| 1,819,133 | Stegeman et al. | Aug. 18, 1931 |
| 2,453,819 | Smith | Nov. 16, 1948 |
| 2,509,343 | Henderson | May 30, 1950 |
| 2,520,488 | Batchelder | Aug. 29, 1950 |
| 2,555,881 | Grangroth | June 5, 1951 |
| 2,590,065 | Mott | Mar. 18, 1952 |
| 2,638,729 | Bourg | May 19, 1953 |
| 2,669,819 | Sawyer | Feb. 23, 1954 |
| 2,696,889 | Mott | Dec. 14, 1954 |